United States Patent [19]
Thorborg

[11] 3,768,001
[45] Oct. 23, 1973

[54] INVERTER FOR TRANSMITTING POWER BETWEEN A DIRECT VOLTAGE SOURCE AND AN ALTERNATING VOLTAGE NETWORK

[75] Inventor: Kjeld Thorborg, Vasteras, Sweden

[73] Assignee: Allmanna Svenska Elektriska Aktiebolaget, Vasteras, Sweden

[22] Filed: Jan. 20, 1972

[21] Appl. No.: 219,393

[30] Foreign Application Priority Data

Jan. 1, 1971 Sweden..........................795/71

[52] U.S. Cl............................................. 321/27 R
[51] Int. Cl. ......................................... H02m 7/48
[58] Field of Search.................... 321/27 R; 307/64, 307/66

[56] References Cited
UNITED STATES PATENTS 3,614,461 10/1971 Speer............................... 307/66 X
3,391,327 7/1968 Pelly................................. 321/27 R
3,308,368 3/1967 Schmidt, Jr....................... 321/27 R
3,407,348 10/1968 Lawrence et al. ............... 321/27 R
3,487,287 12/1969 Demarest............................. 321/9

Primary Examiner—William M. Shoop, Jr.
Attorney—Jennings Bailey, Jr.

[57] ABSTRACT

An oscillator-controlled, self-commutated inverter connection for generating a single- or multi-phase alternating voltage and transmitting power from a direct voltage source to an alternating voltage consumer includes two inverter units, each including capacitor bank connected to the AC terminals of the inverter unit and a converter of the line-commutated type. The AC outputs of the converter are connected to the AC terminals of the inverter unit and the DC outputs are connected to the DC source. Reactor connections connect the DC outputs of the converter to the poles of the DC source. A second converter of the line-commutated type is connected by its DC outputs to the DC source. The two converters are anti-parallel connected to the DC source.

10 Claims, 6 Drawing Figures 3,768,001

INVERTER FOR TRANSMITTING POWER BETWEEN A DIRECT VOLTAGE SOURCE AND AN ALTERNATING VOLTAGE NETWORK

BACKGROUND OF THE INVENTION

1. Field of the Invention

The present invention relates to an inverter for transmitting power between a direct voltage source and an alternating voltage network.

2. The Prior Art

With inverters of this type there are several aims which should preferably be simultaneously fulfilled in certain cases, for example when they are being used as reserve power units. The connection should be able to produce an alternating voltage and alternating current as near as possible to sine-shaped, it should be independent of any external commutating alternating voltage, it should be able to transmit active power both from the direct voltage source to the alternating voltage network and in the opposite direction, it should be able to produce a rapidly variable reactive power in order to satisfy alterations in the reactive power consumption of the load and it should be able to maintain a symetrical alternating voltage even if the alternating current supplied is asymmetrical.

SUMMARY OF THE INVENTION

For the purpose of fulfilling all these requirements in a particularly simple way, according to the invention an oscillator-controlled, self-commutated inverter connection for generating a single- or multi-phase alternating voltage and transmitting power from a direct voltage source to an alternating voltage consumer includes two inverter units, each including a capacitor bank connected to the AC terminals of the inverter unit and a converter of the line-commutated type. The AC outputs of the converter are connected to the AC terminals of the inverter unit and the DC outputs are connected to the DC source. Reactor connections connect the DC outputs of the converter to the poles of the DC source. A second converter of the line-commutated type is connected by its DC outputs to the DC source. The two converters are anti-parallel connected to the DC source.

BRIEF DESCRIPTION OF THE DRAWINGS

The invention will be further described with reference to the accompanying FIGS. 1, 2, 3 and 4, in which

FIG. 4b shows the control of the two inverters of FIG. 4a.

DESCRIPTION OF THE PREFERRED EMBODIMENTS

Figure 1:
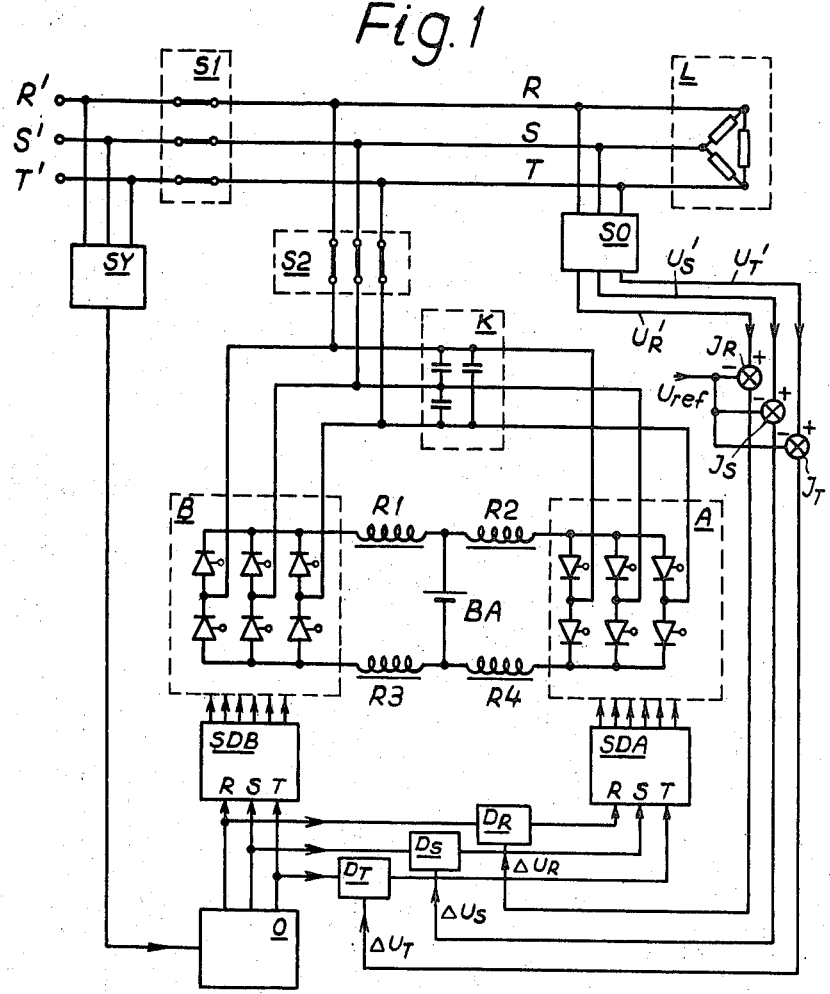
FIG. 1 shows the connection according to the invention used as a reserve power unit.

In FIG. 1, R, S, T is a three-phase network to which a load object L is connected. Of course, several load objects may be connected to the network. The network can be connected over a first converter S1 to a feeding network R', S', T'. The network can be connected over a second converter S2 to the inverter connection formed by the three-phase converter bridges A and B. The converters may suitably comprise thyristor-converters so that rapid connection and disconnection can be achieved.

The rectifiers in the converters A and B consist of thyristors which in known manner receive firing pulses from the control pulse devices SDA and SDB. The bridges are connected in parallel on the AC side, and between the phase conductors a capacitor bank K is connected. From the DC point of view the bridges are anti-parallel-connected to a direct voltage source comprising an accumulator battery BA.

The bridge B operates as a rectifier and the bridge A as an inverter. Since the direct voltage drops over the reactors R1 – R4 are negligible, the direct voltages of the bridges are of equal magnitude and flow in the same direction as the battery voltage. The reactors limit the circulating alternating current which flows through the bridges and also the alternating current component of the current through the battery BA.

A free-running oscillator O delivers pulses direct to SDB which amplifies and distributes these pulses to the rectifiers in the bridge B so that, for example, the pulses at the input R of SDB are supplied with intervals of 180° to the rectifiers connected to phase R in the bridge B. The oscillator pulses are supplied by way of the phase-shifting devices $D_R$, $D_S$, $D_T$ to the control pulse SDA of the bridge A. The pulses which are supplied to input R of SDA are supplied with intervals of 180° to the two rectifiers in bridge A connected to phase R. This means that both the rectifiers in a certain bridge which are connected from that of the same phase conductor are controlled with the same control angle. The rectifiers in one bridge connected to a phase conductor, however, are generally controlled with a different control angle to those rectifiers in the other bridge connected to the same phase conductor. The sum of these two delay angles related to the voltage of the phase conductor is 180° and the difference between them is determined by the phase-shifting device ($D_R$, $D_S$ or $D_T$) pertaining to the phase.

The phase shifting in the phase-shifting devices is determined by the signals $\Delta U_R$, $\Delta U_S$, $\Delta U_T$ supplied to the devices. The line voltage is sensed by a voltage converter SO and converted to representative signals $U_R'$, $U_S'$, $U_T'$, for each phase. These are compared in the devices $J_R$, $J_S$, $J_T$ with a reference signal $U_{ref}$, which corresponds to the desired load voltage. The difference signals $\Delta U_R$, $\Delta U_S$, $\Delta U_T$ are supplied to the phase-shifting devices.

A synchronizing device SY senses the voltage in the network R', S', T', and through the oscillator O synchronizes the inverter voltage to this voltage both in frequency and phase. If there is a voltage cut in the network R', S', T', the oscillator oscillates freely.

During normal operation the switches S1 and S2 are closed and the load L is connected to the network R', S', T', and fed with active power from this network. The bridge B operates as charging rectifier and supplies the battery BA with continuous charging current.

If there is a voltage cut or some other fault on the network R', S', T', the switch S1 is arranged to break the connection between this network and the network R, S, T. The battery BA then supplies direct current and thus active power to the bridge A which feeds active AC power both to the load L and to the bridge B. The active power may be seen partly as a component which flows from the battery through A to the load and partly as a purely circulating component which flows from A through the AC conductors to B and from there through the DC intermediate line back to A.

Balance will automatically be achieved between these active power components in the system and also between the reactive power components. The capacitor bank K generates the reactive power which is consumed by the load L and by the two converters.

The load alternating voltage, as mentioned, is sensed by SO and compared with a reference, thus producing a closed system for automatic regulation of the voltage to the desired level.

If the load L is asymmetrical there will be asymmetry in the alternating current taken out from the inverter connection, i.e. a negative sequence component will occur in this current. Since an inverter has considerable inner negative sequence impedance, even slight asymmetry of the load may give considerable asymmetry in the load alternating voltage. This is avoided in the device shown. Because separate feedbacks are provided for each phase, the control angles for each phase in the inverter connection will be automatically regulated so that the load voltage will be symmetrical. The inverter connection will therefore automatically generate the negative sequence current consumed by the load L.

The switch S2 may suitably be arranged to break the inverter connection away from the network R, S, T if a fault occurs in said connection.

Figure 2:
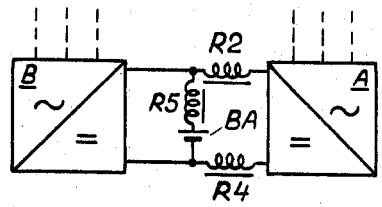
FIG. 2 shows a somewhat simplified embodiment.

FIG. 2 shows an alternative embodiment of the connection of the converters A and B. The reactors R1 and R 3 are replaced by a reactor R5 placed in series with the battery BA.

Figure 3:
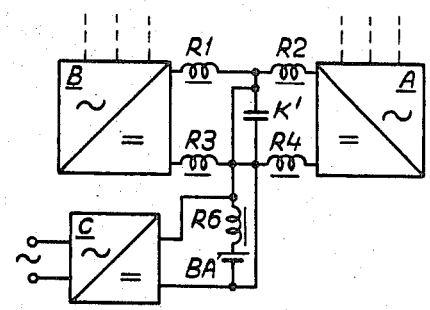
FIG. 3 an embodiment in which a separate converter has been arranged to charge an accumulator battery included in the direct voltage source.

FIG. 3 shows another alternative. The direct voltage source in this case consists of a capacitor K' and the battery BA parallel-connected to this over the reactor R6. Another converter C is connected to the battery and arranged to keep it charged. This embodiment may be suitable in units for high power. The converters A and B in this case may either be continuously connected to the network R, S, T (the breaker S2 is closed) and prepared to take over the supply if the networks R', S', T' should be cut out or S2 may be normally open but arranged to be closed if R', S', T' is cut out.

The charging converter C can be made small since in principle it is only needed to keep the battery BA charged.

With units for low power it may be advantageous to allow the battery to be charged by the converter B (as in FIGS. 1 and 2, for example) since then only two converters are required for the entire unit.

A saving can be made by replacing each of the reactors shown by a reactor connection comprising two series-connected reactors, one having higher inductance than the other and arranged to be saturated upon the occurrence of a direct current which is substantially less than the maximum direct current through the reactors. The need for smoothing inductance decreases with increasing direct current and this embodiment gives an essential reduction in the total rated power of the reactors obtained without impairing the function.

Figure 4A:
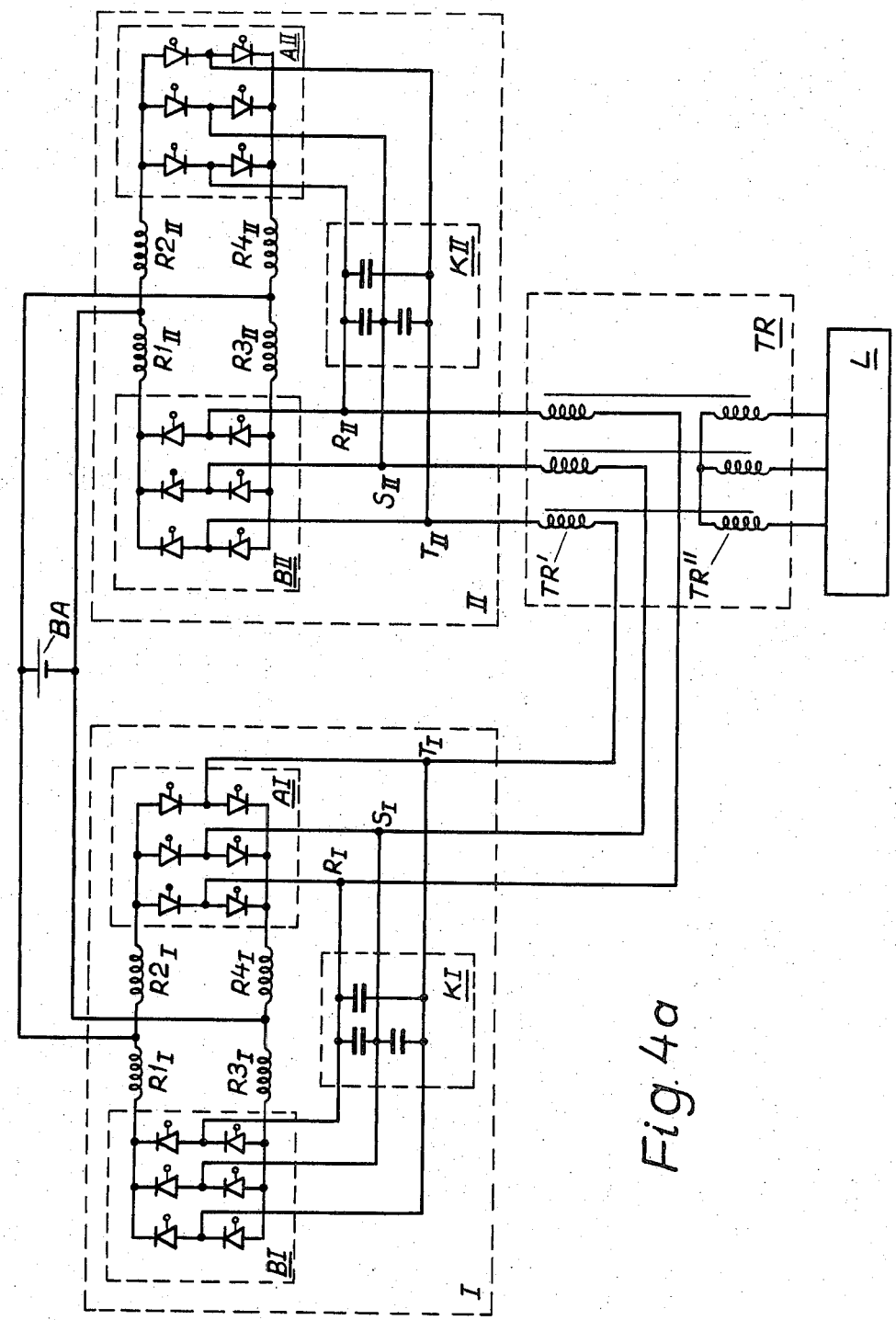
FIG. 4a shows an embodiment having two inverter units, in which the amplitude of the output voltage can easily be controlled within a wide interval.

According to a further development of the invention, shown in FIG. 4a, two inverter units I and II are connected to and fed from the same direct voltage source BA. Each unit is constructed in the same way as the unit shown in FIG. 1, i.e. of two converter bridges A and B of line-commutated type which, by way of four reactors R1 – R4, are anti-parallel-connected on the direct voltage side, and the AC terminals of which are connected together and constitute the AC terminals R S T of the unit. Each unit has a three-phase capacitor bank K on the AC side. The load object L is connected via a transformer TR to the two units. Each of the three primary windings TR' of the transformer is connected between one terminal (for example $R_I$) of one unit and the corresponding terminal ($R_{II}$) of the other unit. The secondary windings TR'' of the transformer are connected to the load object L.

Figure 4B:
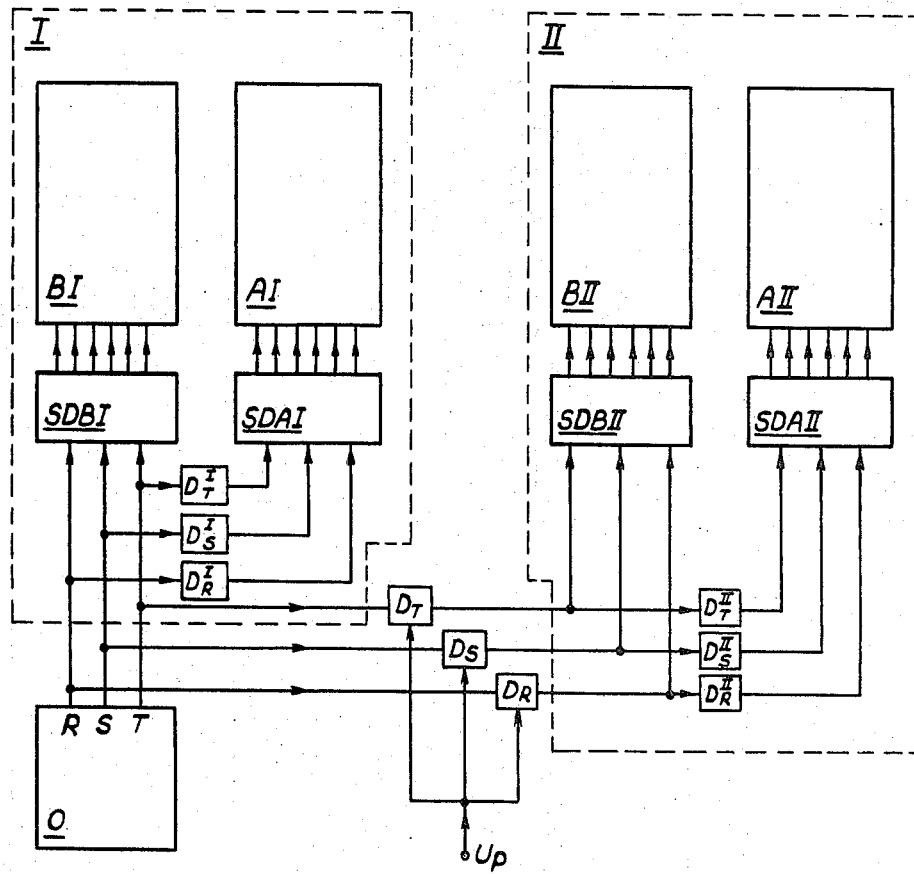

FIG. 4b shows how the control of the two inverter units I and II can be arranged. A free-running oscillator O is arranged as in FIG. 1 to deliver three pulse trains, mutually displaced 120°, which are supplied to the control pulse devices SDA and SDB of the four converters. In each control pulse device the pulses are amplified and distributed to the six rectifiers of respective converters in such a way that these are fired in such an order that the converter generates a three-phase output alternating voltage. The oscillator may be a part of one of these inverter units or may be apart from them. The output pulse train of the oscillator is supplied to the converter BI directly and to the converter AI by way of the delay circuits $D^I_R$, $D^I_S$ and $D^I_T$. These may be arranged, for example, to give mutually equivalent and constant delays of such magnitude that suitable constant delay angles, for example 45°, are obtained in the two converters BI and AI. The inverter II is constructed in the same way as the unit I and the three delay circuits $D^{II}_R$, $D^{II}_S$, $D^{II}_T$ may suitably be identical with the corresponding circuits in the unit I. Each of the units, therefore, will operate in the same way as the unit shown in FIG. 1 and, since the delays are constant, will give constant and mutually equivalent output voltages. The output pulses from the oscillator O are also supplied to the unit II and the two units will therefore operate with the same frequency. The pulses are supplied to the unit II by way of three mutually identical delay circuits $D_R$, $D_S$, $D_T$, which give a variable delay of the pulse trains depending on a control signal $U_p$ which is supplied to the delay circuits. The output alternating voltage from the unit II will therefore be phase-displaced by an angle $\gamma$ after the voltage from the unit I and the phase-shift $\gamma$ can be controlled with the help of the control signal $U_p$.

Figure 4C:
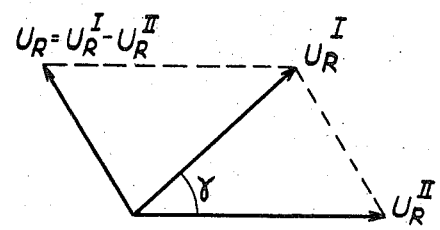
FIG. 4c is a diagram of the phase voltages.

FIG. 4c shows in vector form the phase voltages $U_R^I$ and $U_R^{II}$, where $U_R^{II}$ is phase-displaced by the angle $\gamma$ after $U_R^I$. The primary windings TR' of the transformer TR in FIG. 1 are connected between the output terminals of the two units I and II and the voltage $U_R = U^I_R - U^{II}_R$ thus appears across the primary winding pertaining to phase R. It can easily be shown that, if the amplitudes of the phase voltages from the two units are of equal magnitude and equal to U, the resultant load voltage will be $U_R = 2U \sin \gamma/2$. If, by changing $U_p$, $\gamma$ is shifted between 0° and 180°, the load voltage will therefore vary between O and 2U.

The device therefore gives the possibility of simple control of the load voltage within a considerable interval while retaining satisfactory curve shape. Each inverter unit operates, however, in the shown embodiment with constant output alternating voltage irrespective of the load voltage. There are therefore no problems with commutation within the converters even if the load voltage is zero.

The phase displacement between the units may be manually adjustable or it may be automatically controlled, for example according to the deviation of the load voltage from a reference value which may be constant or variable.

In the embodiment shown the phase-displacement is the same in each phase, but of course the phase-displacement in each phase can be controlled or set separately, individual adjustment control or regulation being obtained from each of the three phase voltages supplied to the load.

The device is shown as three-phase, but it may of course have a different phase number. It might, for example, be single-phase.

In the case shown the load (via the transformer TR) is connected between the terminals of the units and the load voltage is therefore obtained as the vectorial difference between the output voltages of the units. Alternatively of course, a transformer having two primary windings for each phase may be used. The output voltage of one unit is then supplied to one primary winding and the output voltage of the other unit to the other primary winding. The output voltage from the secondary winding of the transformer, which is connected to the load, will then be the vectorial sum of or difference between the output voltages of the two units.

In principle it is irrelevant whether the load voltage is formed as the sum of or the difference between the output voltages of the units. In both cases exactly the same possibilities of variation are obtained for the load voltage. In both cases the output voltages of the units are put together vectorially to form the resultant load voltage and if this operation is called addition or subtraction is in principle only dependent on how the positive reference directions of the output voltages of the units are defined.

The device may of course be made to operate with constant or variable frequency. In the latter case it may be suitable, for example when the load object is an AC machine, to control the phase-shift $\gamma$ between the units and thus the load voltage so that the ration between this voltage and the frequency is constant or almost constant.

The control signal $U_p$ and thus the phase displacement between the units may of course be arranged to be dependent on an arbitrary magnitude desired. For example, the inverter connection may be provided with a circuit for current limitation, which at an overcurrent influences the phase-displacement to reduce the voltage.

I claim:

1. Oscillator-controlled, self-commutated inverter connection to generate a single or multi-phase alternating voltage and to transmit power from a direct voltage source to an alternating voltage consumer, comprising at least one inverter unit, each inverter unit comprising:
   a. a capacitor bank connected to the AC terminals of the inverter unit;
   b. a first converter of line-commutated type, the AC outputs of which are connected to said AC terminals and the DC outputs of which are connected to the DC source;
   c. a first reactor connection connecting one of the DC outputs to one pole of the DC source;
   d. a second reactor connection connecting the other output to the other pole of the DC source, and;
   e. a second converter of line-commutated type connected by its AC outputs to said AC terminals and by its DC outputs to the DC source, the two converters being anti-parallel connected to the DC source.

2. Inverter connection according to claim 1, in which, in one of the connection conduits between the DC output of the second converter and the DC source, a third reactor connection is connected and in the second of said connection conduits a fourth reactor connection is connected.

3. Inverter connection according to claim 1, which comprises control members arranged to emit control pulses to each rectifier in one of the converters, in order to fire the rectifier, and to emit control pulses to the corresponding rectifier in the other converter to fire this rectifier, said last mentioned control pulses having a delay in relation to the first mentioned control pulses.

4. Inverter connection according to claim 1, in which the direct voltage source comprises an accumulator battery.

5. Inverter connection according to claim 4, in which a fifth reactor connection is connected in series with the accumulator battery.

6. Inverter connection according to claim 4, in which a third converter is connected to the accumulator battery to charge it.

7. Inverter connection according to claim 1, which comprises a first and a second inverter unit arranged to operate with mutually equal frequency, and members connected to the AC terminals of the first unit, to the AC terminals of the second unit and to the AC load and arranged to supply this load with a voltage constituting a vectorial combination of the output alternating voltages of the two units, and phase-angle influencing members to affect the phase difference between the two said output alternating voltages and thus the voltage supplied to the alternating voltage load.

8. Inverter connection according to claim 7, in which the AC load is directly connected between the AC terminals of the two units.

9. Inverter connection according to claim 7, including a transformer which has a primary winding connected between the AC terminals of the two units, the secondary winding of the transformer being connected to the load.

10. Inverter connection according to claim 7, which comprises a control member to emit pulses to control firing of the rectifiers forming one of the inverter units, and a pulse-delay member with variable delay for supplying said pulse from the control member to the second inverter unit to control firing of the rectifiers in this unit.

* * * * *

UNITED STATES PATENT OFFICE
CERTIFICATE OF CORRECTION

Patent No. 3768001                Dated October 23, 1973

Inventor(s) Kjeld Thorborg

It is certified that error appears in the above-identified patent and that said Letters Patent are hereby corrected as shown below:

Under "Foreign Application Priority Data"

change "January 1, 1971" to -- January 25, 1971 --.

Signed and sealed this 1st day of January 1974.

(SEAL)
Attest:

EDWARD M. FLETCHER, JR.
Attesting Officer

RENE D. TEGTMEYER
Acting Commissioner of Patents